United States Patent [19]

Borzym

[11] 3,924,502
[45] Dec. 9, 1975

[54] CLAMPING DIE JAW INSERT FOR TUBE CUTOFF APPARATUS

[75] Inventor: John J. Borzym, Birmingham, Mich.

[73] Assignee: Alpha Industries, Inc., Detroit, Mich.

[22] Filed: Jan. 30, 1975

[21] Appl. No.: 545,759

[52] U.S. Cl. .......................... 83/454; 83/382; 83/54
[51] Int. Cl.² .............................................. B26D 7/04
[58] Field of Search ............ 83/382, 454, 455, 456, 83/375, 54

[56] References Cited
UNITED STATES PATENTS 3,234,838    2/1966    Faull ..................................... 83/454
3,273,433    9/1966    Borzym ................................. 83/54

Primary Examiner—Willie G. Abercrombie
Attorney, Agent, or Firm—Thomas N. Young

[57] ABSTRACT

A clamping jaw for a tube cutoff apparatus wherein a plurality of relief steps are provided in the face of the clamping member which normally operates adjacent the severing blade. The relief steps are diagonally machined across the face of the clamping member and at least one of the relief steps intercepts the clamping aperture so as to provide successively increased clearance between the blade and the clamping body during the severing process.

7 Claims, 5 Drawing Figures

CLAMPING DIE JAW INSERT FOR TUBE CUTOFF APPARATUS

INTRODUCTION

This invention relates to cutoff apparatus for tubular stock and particularly to an improved clamping member for holding the stock during the severing operation.

BACKGROUND OF THE INVENTION

Cutoff presses are commonly used to sever tubular metal stock; one example involves the combination of a cutoff press with a tube mill from which welded tubing emerges substantially continuously and at a high rate of travel. The cutoff press often comprises an accelerator which moves a clamping die set up to the speed of the tubing and accommodates a pointed severing blade which is caused to pass through the tubing severing it to the desired length. Such a cutoff press is disclosed in the U.S. Pat. No. 3,273,433 to A. Borzym.

The cutoff or severing operation involves clamping the tube between clamping members, commonly called "jaws", prior to and during the actual penetration of the workpiece by the blade. This assures that the workpiece is stationary during the severing operation thus minimizing lateral forces on the blade and producing the highest possible quality cut. The clamping jaws are often manufactured as inserts which can be removed from the die assembly and periodically replaced with a new or reconditioned set.

In the course of the severing operation the blade, being of finite thickness, actually collapses and deforms the tube wall creating a quantity compressed and coined metal which must be carried ahead of the blade through the balance of the severing operation. Forcing this quantity of metal through the clamping assembly inherently produces heat and increasing frictional forces especially since the clearance between the faces of the blade and the blade support surfaces of the clamping members is very small. It has been found that attempts to increase this clearance for the purpose of accommodating the deformed metal of the severed tube reduces the support for the blade and in many cases results in a catastrophic blade failure within a very small number of cuts.

The approach to the solution of this problem provided by the prior art involves the formation of a relief step in the faces of the clamping members which are adjacent the blade faces, this step passing across the face immediately below the clamping aperture so as to provide increased clearance immediately below the clamping area. This solution does not take into account the fact that by the time the coined and compressed metal reaches the relief step, the severing operation is substantially if not completely accomplished and thus the maximum benefit of increased clearance is not realized.

BRIEF SUMMARY OF THE INVENTION

In accordance with the present invention a plurality of relief steps are provided in the faces of a clamping member to provide successively increasing clearances between the blade face and the support surfaces of the clamping members in the area of the clamping aperture such that the blade encounters a series of increasing clearance areas while it is in the actual area of tube severance. In the preferred form the relief steps are formed in parallel and diagonally across the support surfaces of the clamping members such that the center or point of a typical cutoff blade is supported by close proximity to the die jaw insert substantially entirely through the severing area; in other words, the relief steps slant back along the path of blade travel as the point of reference moves outwardly from the center of the clamping assembly and the centerline of the blade.

DETAILED DESCRIPTION OF THE SPECIFIC EMBODIMENT

Figure 1:
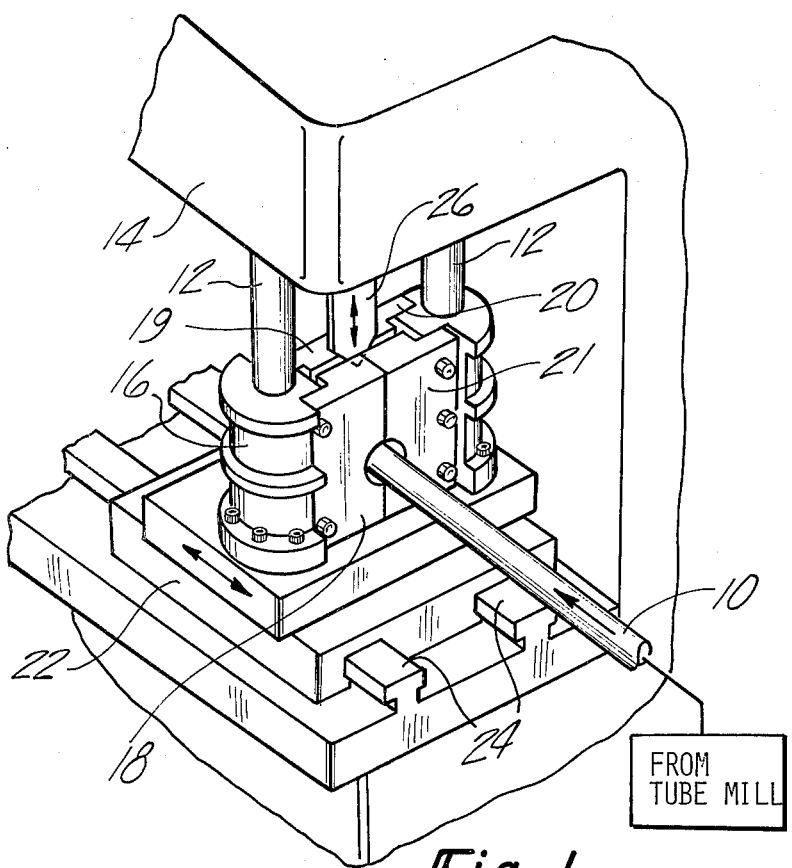
FIG. 1 is a perspective drawing of a system for producing tubular stock and for severing the stock into lengths.
Figure 2:
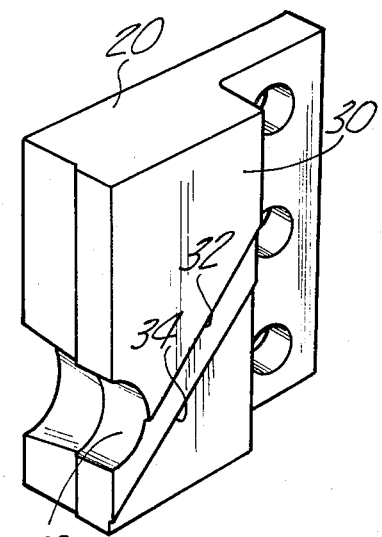
FIG. 2 is a detail drawing of a die jaw insert embodying the invention.

Referring now to the drawings there is shown a quantity of tubular steel stock 10 emanating from a tube mill (not shown) at substantially uniform speed toward a cutoff press assembly 14 where the tubular stock 10 is periodically severed to desired lengths. Assembly 14 is a mechanically or hydraulically driven press comprising vertical guide pins 12 which operate through a cam mechanism within a mechanical die set 16 to control the opening and closing of tube clamping dies 18, 19, 20 and 21 in synchronism with the vertical of the guide pins 12 so as to clamp tube 10 when the press drives blade 26 downwardly. Clamping dies 18, 19, 20 and 21 are provided with registering partial apertures in mating faces to define a clamping zone for receiving the tubular steel stock 10 and holding the stock during its severing operation. Die set 16 is mounted on a slide carriage 22 which is caused to be moved along ways 24 in the direction of travel of the steel stock 10 by an accelerator device until the speed of the die set matches the speed of the stock 10. At this time operation of the press 14 causes the blade 26 to descend vertically through the clamping assembly and through the clamped steel stock. Follwing this operation the blade is withdrawn and the cam mechanism in die set 16 releases the stock 10 such that the stock may move relative to the clamping assembly once more.

Figure 3:
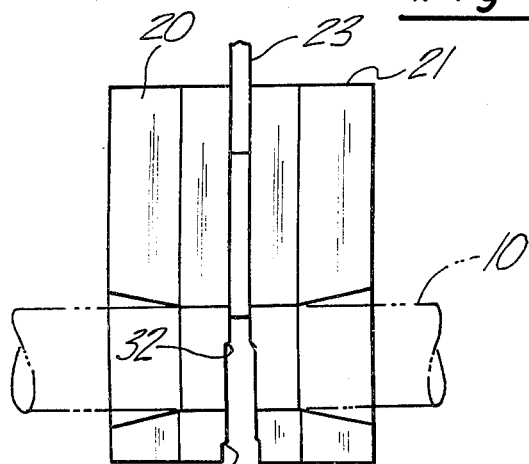
FIG. 3 is a side view of a die jaw insert set showing a tube about to be cut.

Looking to the clamping member 20 as representative of all of the members in the assembly, it will be noted that the member 20 comprises a solid steel body which is carefully machined to precise dimensions so as to provide a large planar blade support surface 20 which, during the severing operation is closely adjacent the face of the blade 26 to provide support for the blade. Semi-cylindrical clamping aperture 28 is formed in the edge of member 20 and flared at 29 for tube entry and exit as shown in FIG. 3. In the area of the clamping aperture 28 relief steps 32 and 34 are provided. The relief steps afford successively increasing clearance between the faces of the blade 26 and the resulting faces of the clamp member 20 as shown. The relief steps 32 and 34 are parallel and extend diagonally across the body of the clamping member 20 thus to project back along the path of blade travel as the point of reference moves outwardly from the centerline of the blade; i.e., from left to right in the drawing of FIG.

2. It should also be noted that step 32 intercepts the partial aperture 28 in the member 20 such that at least the first relief step is encountered by the blade during the severing operation as best shown in FIG. 3. The second step 34 extends below the actual boundaries of the partial aperture 28 but because of the diagonal nature thereof projects upwardly across the face of the clamping member.

Figure 4:
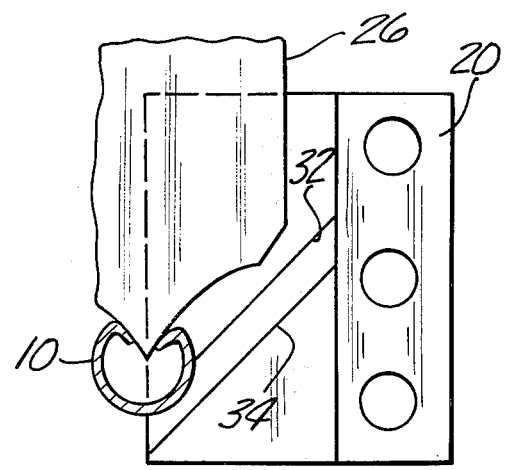
FIG. 4 is a plan view of a die jaw insert and a blade partially through a workpiece.
Figure 5:
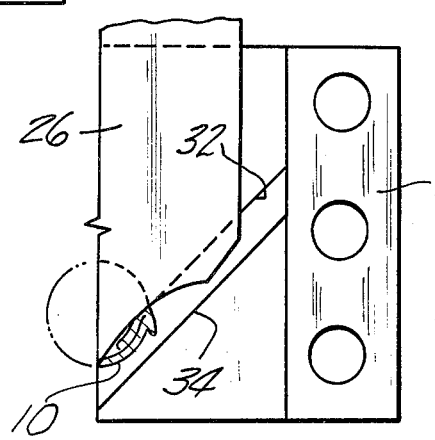
FIG. 5 is a plan view of the same insert and blade but farther into the severing operation.

In operation, the blade, which is a centrally pointed body of finite thickness, progresses into the tube wall as shown in FIG. 4 causing the material at the top of the tube wall to be displaced inwardly. As the blade progresses into the tube 10, the wall of the tube becomes more and more at right angles with the advancing surface of the blade such that the tube material is actually being crushed and then coined outwardly in ever increasing quantities. The outward flow of material is believed to begin approximately as the blade 26 reaches the half-way point in the severing operation as depicted in FIG. 5. As the collapsed and coined material reaches the step 32, increased clearance between the blade and the body 20 is provided thus to accommodate the growing quantity of material and reduce the friction and heat generated by the severing operation. The stop 32 is encountered at the point of maximum resistance inasmuch as the step 32 actually intercepts the partial aperture 24 and thus occurs approximately half-way through the severing procedure. The second step 34 is encountered in sufficient time to accommodate the substantially maximized volume of deformed tube wall which is being shoved ahead of the blade 26 as shown.

In summary, the subject invention provides a clamping body which is preferably used in combination with other reversely similar bodies in opposed pairs to clamp a tubular metal workpiece during a severing operation. Moreover the present invention, preferably implemented in the form of a replaceable insert, provides two or more successively encountered relief steps to accommodate the growing quantity of deformed metal produced during the severing operation at least the first of these relief steps being encountered by the blade in the area of the clamping aperture thus to accommodate the deformed material near the point of maximum resistance. It will be understood that still greater numbers of steps may be provided.

The embodiments of the invention in which an exclusive property or privilege is claimed are defined as follows:

1. For use in a cutoff apparatus of the type having a pair of opposed clamping members for holding a tubular workpiece and a blade which is displaceable along a path of travel which extends through the workpiece proximate the clamping members to sever the workpiece into lengths, each of said clamping members comprising: a body of rigid material having a blade support surface which extends parallel to the path of blade travel and adapted to work in close clearance with the blade over the major portion thereof; a partial aperture intercepting the surface and in opposition to another such partial aperture in the opposite clamping member to clamp the workpiece; and a plurality of relief steps formed in said surface to provide successively greater clearances between the blade and the body as it displaces along the path of travel in the area of the aperture.

2. Apparatus as defined in claim 1 wherein the relief steps are parallel to one another.

3. Apparatus as defined in claim 1 wherein the relief steps extend diagonally across the path of the blade travel to provide the greatest support for the centerline of the blade and the greatest clearance for the laterally outermost portions of the blade.

4. Apparatus as defined in claim 1 wherein at least one of the relief steps intercepts the clamping aperture in the body.

5. Apparatus as defined in claim 4 wherein the step which intercepts the clamping aperture occurs at approximately the point of maximum severing resistance during the travel of the blade through the tubular workpiece.

6. Apparatus as defined in claim 1 wherein the partial aperture comprises a first cylindrical portion and a second flared portion which is contiguous with the cylindrical portion, the relief steps being provided in the support surface which is bounded by the cylindrical aperture portion.

7. For use in a cutoff apparatus for tubular stock, a die jaw insert comprising a body of rigid material having a planar blade support surface, a partial aperture formed in the body and intercepting the blade support surface, and a plurality of relief steps formed in the blade support surface to provide successively greater clearances between the body and a severing blade advancing thereacross, at least one of the relief steps intercepting the partial aperture.

* * * * *